March 18, 1930.  R. ROYAL  1,750,863
RECORDING APPARATUS
Original Filed Dec. 13, 1926
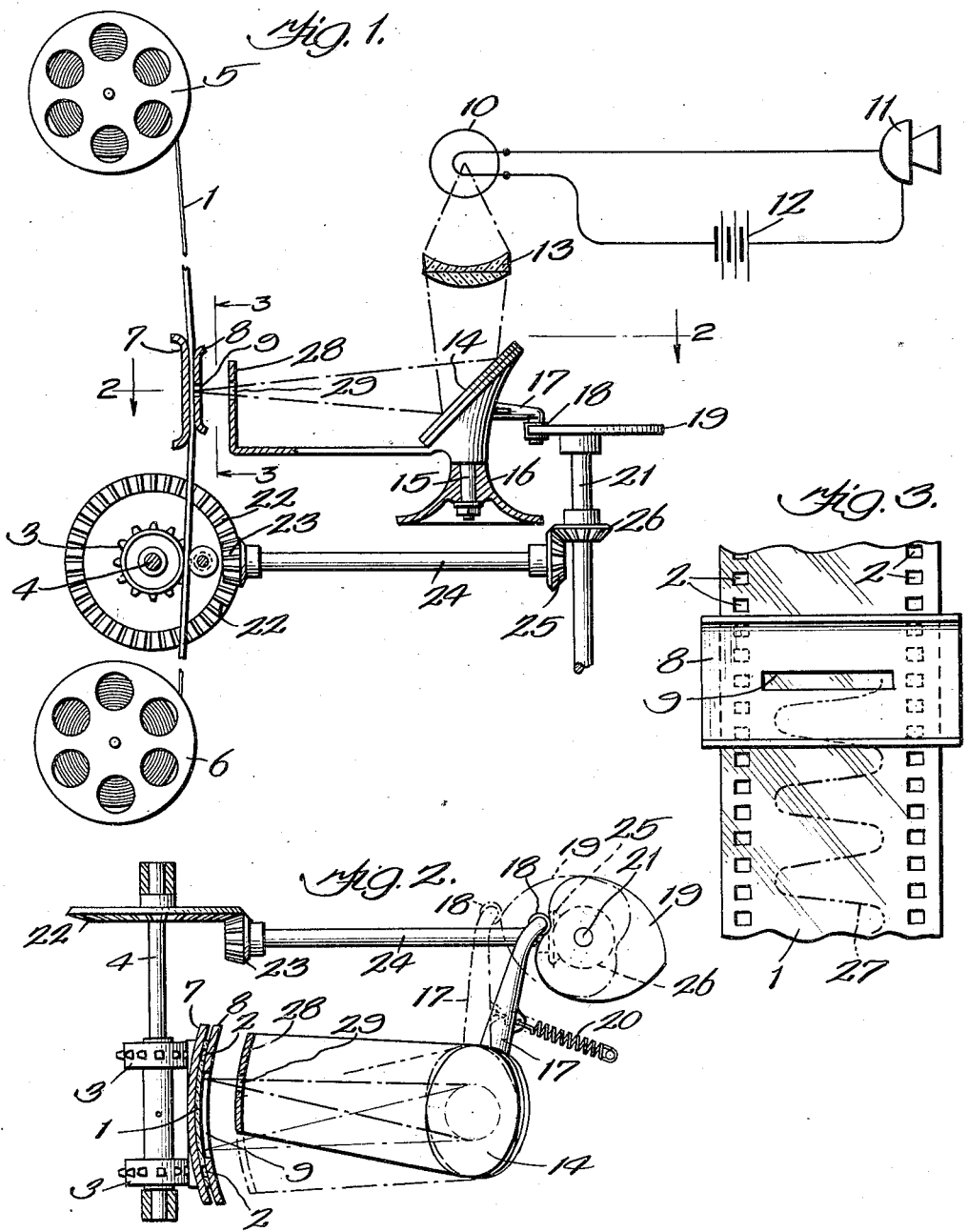
Inventor:
Roscoe Royal Patented Mar. 18, 1930

1,750,863

UNITED STATES PATENT OFFICE

ROSCOE ROYAL, OF CHICAGO, ILLINOIS

RECORDING APPARATUS

Application filed December 13, 1926, Serial No. 154,592. Renewed August 12, 1929.

My invention relates to recording apparatus employing a source of light, a sensitized recording member, and means whereby light emanating from said source may be employed to produce a record upon said recording member.

My invention is of particular service when employed for recording sound which is in controlling relation to the light for the purpose of recording. In the preferred embodiment of the invention an incandescent or other lamp containing neon or other gas is included in a local circuit with a microphone whereby the intensity of the light emanating from the lamp varies with the sound waves impressed upon the circuit terminals in the microphone. A beam of the fluctuating light emanating from the lamp is directed upon the recording member which is preferably a flexible sensitized or photo sensitive transparent film ribbon and which is unwound from a supply reel and wound upon a take-up reel by suitable mechanism. Mechanism is employed for shifting the light beam where it impinges upon the film whereby a recording line of varying translucency or transparency is produced upon the film and which will serve to effect a reproduction of the sound when the film is passed through a suitable reproducing apparatus, as is understood by those skilled in the art. In the preferred embodiment of the invention a lens structure receives a light beam of conical shape from the lamp and refracts the same into a beam which is conically tapered toward a mirror which reflects the beam upon the film, the mirror serving to finally taper the beam to a point that impinges upon the film to trace a recording line on the film. Some portion of the beam, preferably that portion which is reflected by the mirror, is shifted in a regulated manner so that the recording line upon the film will not be a straight line but will be a line of varying directions, preferably a sinuous line, so that it will be many times the length of the film ribbon, mechanism being preferably employed for imparting suitable movement to the mirror for this purpose.

A film ribbon bearing a record produced in accordance with my invention, may be used to reproduce sound in an apparatus also serving to project moving pictures.

The invention will be more fully explained in connection with the accompanying drawing in which Fig. 1 is a view illustrating the preferred embodiment of the invention, this figure being somewhat diagrammatic; Fig. 2 is a sectional view on line 2—2 of Fig. 1, an alternative position of some of the parts being illustrated by dot and dash lines; and Fig. 3 is a sectional view on line 3—3 of Fig. 1.

The transparent sensitized film ribbon 1 is formed with the usual openings 2 along its sides which receive the teeth of propelling sprocket wheels 3 provided upon a shaft 4, the ribbon being drawn from a supply reel 5 and wound upon a take-up reel 6 by any suitable or well-known mechanism. The ribbon passes between two guides 7 and 8 which snugly embrace it. The guide 8 is formed with a light transmitting opening or slot 9 extending cross-wise of the film and through which slot or opening the light beam acts upon the sensitized film.

When the apparatus is employed for recording sound an incandescent lamp 10 is desirably included in a local circuit with a microphone 11 and a battery 12, the light emanating from the lamp varying in intensity owing to the variation in the resistance in said local circuit occurring at the microphone in accordance with the sound waves impressed upon the microphone. A beam of light emanating from the lamp passes through the opening 9 in the guide 8 and acts upon the film to produce a recording line, preferably of sinuous form, on the film whose transparency or translucency varies with the intensity of the light. The light beam emanating from the lamp and employed for the recording purpose is desirably conically tapered to an apex or point where it impinges upon the film so that the light beam, in effect, becomes a stylus for producing a recording line upon the film. The light beam where it strikes the traveling film ribbon is shifted in a predetermined manner so that the film may be employed in a properly constructed reproducing apparatus for reproducing the recorded sound.

In the preferred embodiment of the invention, a light controlling member 13, in the form of a lens structure, is employed for conically tapering the light beam which has passed therethrough, the beam impinging upon another light controlling member 14 which is desirably in the nature of a mirror or reflector which merely bends the beam without materially modifying the tapering thereof, the reflecting surface of the reflector being preferably flat. One of the light controlling members, preferably the reflector 14, is moved in a predetermined manner so that the recording line traced by the beam on the film ribbon is varied to make it of any desired length with reference to the length of the film ribbon. In the embodiment of the invention illustrated, the reflector is provided upon the upper end of a vertical shaft 15 journalled in a suitable pedestal 16. A bracket 17 projects rearwardly from the reflector and carries a cam roller 18 which is held against a heart-shaped cam 19 by means of a spring 20. Said cam is carried upon the upper end of a constantly rotating shaft 21 which may be driven by a crown gear 22 which turns with the shaft 4, a bevel pinion 23 meshing with the gear 22, a shaft 24 carrying the pinion 23, a bevel pinion 25 upon the shaft 24 and a bevel pinion 26 upon the shaft 21. Fig. 3 illustrates a sound recording line 27 produced upon the film ribbon 1 by the tracing stylus of light whose intensity is varied by the microphone 11. The film ribbon 1 is thus in continuous movement while the record is being placed thereon. The light controlling member 14 and the film ribbon 1 are both thus operated by unitary mechanism whereby the recording line 27 is given a predetermined position upon and with reference to the ribbon and with reference to the openings 2 in the ribbon so that the ribbon, or replicas thereof, may be successfully used in a suitable sound reproducing apparatus.

In order to prevent the reflector from reflecting any side lights upon the film, it is provided with an apron 28 which shifts therewith and which has a small hole 29 therethrough through which the apex end of the light beam passes. In order that the tracing apex of the light beam may be caused to travel exactly at the surface of the film ribbon, the guides 7 and 8 are cylindrically curved upon an axis coincident with the shaft 15 of the reflector, as illustrated in Fig. 2. That is, the tapered tracing end or stylus portion of the light beam swings upon a center which is also the center of the arcuate curvature of the ribbon.

It is obvious that other forms of artificial light or natural light may be used and other methods of varying the light passing to the record film ribbon or base may be introduced.

It should also be understood that the record film ribbon or base after being exposed to the light sound impressions is subjected to the necessary operations of development and fixation after which it may be used to reproduce the sound or signals recorded or used as a negative from which to print positive copies.

Changes may be made without departing from the invention.

Having thus described my invention, I claim:

1. The combination with a source of light; of operable means for varying the light; a structure receiving light from said source and contracting the light passed thereto into a beam tapering from such structure; a reflector in the path of said beam for deflecting the beam; a sensitized ribbon impinged upon by said light beam where this beam is contracted; and mechanism effecting movement of the reflector to move the portion of the beam that impinges upon the ribbon transversely of the ribbon and effecting continuous lineal travel of the ribbon while the beam of light is impinging upon the ribbon.

2. The combination with a source of light; of operable means for varying the light; a light controlling member receiving light from said source and contracting the light passed thereto into a beam tapering from such member; another light controlling member in the form of a reflector in the path of said beam for deflecting the beam; a sensitized ribbon impinged upon by said light beam where this beam is contracted; and mechanism effecting movement of one of said light controlling members to move the portion of the beam that impinges upon the ribbon transversely of the ribbon and effecting continuous lineal travel of the ribbon while the beam of light is impinging upon the ribbon.

3. The combination with a source of light; of operable means for varying the light; a structure receiving light from said source and contracting the light passed thereto into a beam tapering from such structure; a sensitized ribbon impinged upon by said light beam where this beam is contracted; and mechanism effecting movement of the portion of the light beam impinging upon the ribbon transversely of the ribbon and effecting continuous lineal travel of the ribbon while the beam of light is impinging upon the ribbon.

4. The combination with a source of light; of operable means for varying the light; a structure receiving light from said source and contracting the light passed thereto into a beam tapering from such structure; a reflector in the path of said beam for deflecting the beam; a sensitized member impinged upon by said light beam where this beam is contracted; and mechanism effecting movement of the reflector to move the portion of the beam that impinges upon the sensitized member and effecting continuous travel of the sensitized member while the beam of light is impinging upon the sensitized member.

5. The combination with a source of light; of operable means for varying the light; a light controlling member receiving light from said source and contracting the light passed thereto into a beam tapering from such member; another light controlling member in the form of a reflector in the path of said beam for deflecting the beam; a sensitized member impinged upon by said light beam where this beam is contracted; and mechanism effecting movement of one of said light controlling members to move the portion of the beam that impinges upon the sensitized member and effecting continuous travel of the sensitized member while the beam of light is impinging upon the sensitized member.

6. The combination with a source of light; of operable means for varying the light; a structure receiving light from said source and contracting the light passed thereto into a beam tapering from such structure; a sensitized member impinged upon by said light beam where this beam is contracted; and mechanism effecting movement of the portion of the light beam impinging upon the sensitized member and effecting continuous travel of the sensitized member while the beam of light is impinging upon the sensitized member.

7. The combination with a source of light; of operable means for varying the light; a structure receiving light from said source and contracting the light passed thereto into a beam tapering from such structure; a reflector in the path of said beam for deflecting the beam; a sensitized member impinged upon by said light beam where this beam is contracted; and mechanism effecting movement of the reflector to move the portion of the beam that impinges upon the sensitized member and effecting the continuous travel of said sensitized member while the beam of light is impinging upon the sensitized member.

8. The combination with a source of light; of operable means for varying the light; a structure receiving light from said source and contracting the light passed thereto into a beam tapering from such structure; a movable reflector in the path of said beam for deflecting the beam; and a sensitized member impinged upon by said light beam and mechanism for effecting the continuous travel of said sensitized member while the beam of light is impinging upon the sensitized member.

9. The combination with a source of light; of operable means for varying the light; a light controlling member receiving light from said source and contracting the light passed thereto into a beam tapering from such member; another light controlling member in the form of a reflector in the path of said beam for deflecting the beam; a sensitized member impinged upon by said light beam where this beam is contracted; and mechanism effecting movement of one of said light controlling members to move the portion of the beam that impinges upon the sensitized member and effecting the continuous travel of said sensitized member while the beam of light is impinging upon the sensitized member.

10. The combination with a source of light; of operable means for varying the light; a structure receiving light from said source and contracting the light passed thereto into a beam tapering from such structure; a sensitized ribbon impinged upon by said light beam where this beam is contracted; and mechanism effecting movement of the portion of the light beam impinging upon the ribbon transversely of the ribbon and about a center upon which the ribbon is also curved and effecting continuous lineal travel of the ribbon while the beam of light is impinging upon the ribbon.

In witness whereof, I hereunto subscribe my name.

ROSCOE ROYAL.